(12) United States Patent
Babel (10) Patent No.: US 12,130,299 B2
(45) Date of Patent: Oct. 29, 2024

(54) LABORATORY DEVICE HAVING LATERAL SURFACES WITH COUPLING INTERFACES, AND LABORATORY DEVICE ARRANGEMENTS USING SAME

(71) Applicant: IKA-Werke Gmbh & Co. KG, Staufen (DE)

(72) Inventor: Christian Babel, Staufen (DE)

(73) Assignee: IKA-Werke GmbH & Co. KG, Staufen (DE)

( * ) Notice: Subject to any disclaimer, the term of this patent is extended or adjusted under 35 U.S.C. 154(b) by 428 days.

(21) Appl. No.: 17/611,655

(22) PCT Filed: Apr. 7, 2020

(86) PCT No.: PCT/EP2020/059903
§ 371 (c)(1),
(2) Date: Nov. 16, 2021

(87) PCT Pub. No.: WO2020/229059
PCT Pub. Date: Nov. 19, 2020

(65) Prior Publication Data
US 2022/0196687 A1 Jun. 23, 2022

(30) Foreign Application Priority Data
May 16, 2019 (DE) ............... 10 2019 112 943.5

(51) Int. Cl.
*G01N 35/00* (2006.01)

(52) U.S. Cl.
CPC .......... *G01N 35/00722* (2013.01); *G01N 2035/00306* (2013.01); *G01N 2035/00534* (2013.01); *G01N 2035/00891* (2013.01)

(58) Field of Classification Search
None
See application file for complete search history.

(56) References Cited

U.S. PATENT DOCUMENTS

2010/0281987 A1 11/2010 Buschnakowski et al.
2013/0045473 A1 2/2013 Duerr et al.
(Continued)

FOREIGN PATENT DOCUMENTS

CN 1027622135 A 10/2012
DE 8601344 U1 6/1986
(Continued)

OTHER PUBLICATIONS

International Search Report from PCT International Application No. PCT/EP2020/059903, dated Jun. 24, 2020.
(Continued)

*Primary Examiner* — Peter J Macchiarolo
*Assistant Examiner* — Jermaine L Jenkins
(74) *Attorney, Agent, or Firm* — Budzyn IP Law, LLC (57) ABSTRACT

The invention is concerned with improvements in the technical field of laboratory devices. To this end, what is proposed, inter alia, is a laboratory device (1) that has, on its housing (2), at least one coupling interface (3) and at least one mating coupling interface (4) compatible with the coupling interface (3). The coupling interface (3) and the mating coupling interface (4) are configured to transfer power and/or to transfer information.

28 Claims, 5 Drawing Sheets

(56) References Cited

U.S. PATENT DOCUMENTS

| | | | | |
|---|---|---|---|---|
| 2013/0266952 | A1* | 10/2013 | Goemann-Tho | B01L 3/021 |
| | | | | 435/6.12 |
| 2014/0295562 | A1 | 10/2014 | Wakamiya et al. | |
| 2015/0182961 | A1* | 7/2015 | Arnold | B01L 99/00 |
| | | | | 709/219 |
| 2020/0276545 | A1* | 9/2020 | Reinhold | B01F 35/93 |

FOREIGN PATENT DOCUMENTS

| | | |
|---|---|---|
| DE | 9318772 U1 | 2/1994 |
| DE | 4341773 C1 | 3/1995 |
| DE | 20316560 U1 | 1/2004 |
| DE | 102016108749 A1 | 11/2017 |
| DE | 202017004815 U1 | 11/2017 |
| DE | 102016120667 A1 | 5/2018 |
| EP | 3428653 A1 | 9/2021 |
| WO | 2011101642 A2 | 8/2011 |
| WO | 2015126839 A1 | 8/2015 |
| WO | 2017164378 A1 | 9/2017 |
| WO | 2019053208 A1 | 3/2019 |

OTHER PUBLICATIONS

Office Action from Chinese Application No. 202080036208.2 dated Mar. 25, 2024.

* cited by examiner

LABORATORY DEVICE HAVING LATERAL SURFACES WITH COUPLING INTERFACES, AND LABORATORY DEVICE ARRANGEMENTS USING SAME

CROSS-REFERENCE TO RELATED APPLICATIONS

This Application is a National Stage Application under 35 U.S.C. § 371 of PCT Application No. PCT/EP2020/059903, filed Apr. 7, 2020, which claims priority to German Patent Application No. 10 2019 112 943.5, filed May 16, 2019, the entire contents of which are incorporated by reference herein.

FIELD OF THE INVENTION

The invention relates to laboratory devices, to a laboratory device arrangement comprising at least two laboratory devices and to the use of a laboratory device.

BACKGROUND OF THE INVENTION

Laboratory devices are already known in various embodiments from experience; such as for example in the form of laboratory stirrers, which are also referred to as magnetic stirrers when they have a magnetic stirring drive.

One requirement for efficient, safe and convenient work with such laboratory devices and laboratory device arrangements is simple and convenient handling thereof.

SUMMARY OF THE INVENTION

The invention is based on the object of providing a laboratory device and a laboratory device arrangement of the type mentioned at the outset, the handling of which is convenient and simple.

To achieve this object, what is first of all proposed is a laboratory device having the means and features of the first independent claim targeting a laboratory device. To achieve the object, what is thus in particular proposed is a laboratory device having a housing on which at least one coupling interface and at least one mating coupling interface compatible with the coupling interface are arranged, wherein the coupling interface and the mating coupling interface are designed to transfer power and/or to transfer information.

If two laboratory devices according to the invention are used together, it is possible to connect the laboratory devices to one another such that one laboratory device, connected to the other, is able to be supplied with power through a power transfer from the one laboratory device and its coupling interface to the corresponding mating coupling interface of the other laboratory device. It is likewise possible to potentially transfer information between the laboratory devices coupled in this way. Information, for example control pulses and/or information about particular process parameters of the laboratory devices, is thus able to be transferred between and/or via the laboratory devices via the coupling interface and the mating coupling interface.

Power connection cables are used to supply power, as in the case of previously known laboratory devices, wherein each laboratory device is supplied with power by its respective own power connection cable. Depending on the location of the laboratory devices, the power connection cables possibly have to be laid over work surfaces as far as a power connection. If a plurality of the previously known laboratory devices are intended to be used in a laboratory workspace, it is barely possible to lay the multiplicity of required connection cables in an ordered and space-saving manner. The connection cables are often simply laid transversely across the workspace on which the laboratory devices are intended to be placed. A similar situation applies with any data cables that are used to actuate or read the previously known laboratory devices. The multiplicity of cables leads to disorder, complicates handling of the laboratory devices and is also disadvantageous for operational safety reasons.

Separate wiring of each laboratory device, as was previously necessary, is thus able to be dispensed with when using two or more laboratory devices according to the invention. Only one of the laboratory devices still has to be provided with a power connection cable and/or with a data cable. In particular when a combined power and data cable is used, it is possible not only to transfer power, but also to transfer information via the coupling interface and the mating coupling interface.

The at least one coupling interface of the laboratory device may be arranged or formed on a first lateral surface of the housing. The at least one mating coupling interface may be arranged on a second lateral surface of the housing. It is thereby possible to connect a plurality of laboratory devices that are compatible with one another at least in terms of their coupling interfaces and mating coupling interfaces and to create a cluster or an arrangement of laboratory devices that is able to be connected to a power source and supplied with power via a single power connection cable.

If a higher power is intended to be introduced into the laboratory device, it is also possible to connect two or more power cables or power supplies to the laboratory device via one or more coupling interfaces or mating coupling interfaces. A laboratory device arrangement comprising a plurality of laboratory devices coupled to one another may then be supplied with the power required for it to operate via the two or more power cables.

At least one electrical, in particular electronic, functional unit, such as for example a drive and/or a heater, may be arranged in the housing of the laboratory device. This functional unit may be electrically connected and/or connected in terms of information to the at least one coupling interface and/or to the at least one mating coupling interface of the laboratory device. The functional unit of the laboratory device may thus be supplied with power via the coupling interface and/or the mating coupling interface and possibly also supplied with information, that is to say for example with control signals.

In one preferred embodiment of the laboratory device, provision is made for the coupling interface to comprise a plug connector and for the mating coupling interface to comprise a mating plug connector. Two laboratory devices to be connected to one another are able to be mechanically coupled to one another by way of the plug connector and the mating plug connector. The plug connector and the mating plug connector additionally ensure that a connection established between two laboratory devices for transferring power and/or for transferring information is not broken unintentionally. This may be advantageous in particular in the case of laboratory devices that have a drive, that is to say possibly cause oscillations and/or vibrations.

It is furthermore possible for the coupling interface to have a magnetic coupling element and for the mating coupling interface to have a magnetic mating coupling element. By virtue of the mutually compatible magnetic coupling elements/mating coupling elements, it is possible to transfer a holding force between these and to secure an established connection between two coupled laboratory devices. This may also promote a reliable connection between two such laboratory devices.

It is furthermore possible for the coupling interface to have a latching element and for the mating coupling interface to have a mating latching element. The latching element and the mating latching element make it possible to provide haptic and/or acoustic feedback when the coupling interface is connected correctly to the mating coupling interface. A latching element and a corresponding mating latching element additionally promote a reliable connection of two such laboratory devices to one another and help to avoid unwanted breakage of the connection.

If the housing of the laboratory device has a symmetrical cross section, it is particularly simple to produce a laboratory device arrangement consisting of such laboratory devices coupled to one another and to configure it according to the spatial conditions that are present.

In one preferred embodiment of the laboratory device, provision is made for lateral surfaces of the housing to be arranged at a right angle to one another, in particular for mutually adjoining lateral faces of the housing to be arranged at a right angle to one another. The laboratory device is thereby able to have a substantially rectangular cross section that is able to promote a tidy and freely expandable modular structure of a laboratory device arrangement consisting of laboratory devices.

If the coupling interface has a centering means and/or if the mating coupling interface has a mating centering means, two laboratory devices are able to be connected to one another in a convenient and simple manner. A housing protrusion or a housing bulge may for example serve as centering means. The mating centering means may be formed accordingly and be designed for example as a housing indentation.

In one embodiment of the laboratory device, provision is made for a coupling interface and a mating coupling interface to each be arranged on opposing lateral surfaces of the housing. A coupling interface or a mating coupling interface may also each be arranged on each lateral surface of the housing. It is also possible for both a coupling interface and a mating coupling interface to be arranged on each lateral surface of the housing.

In one preferred embodiment of the laboratory device, provision is made for a respective coupling interface to be arranged on two mutually adjoining lateral surfaces of the housing and for a respective mating coupling interface to be arranged on two mutually adjoining lateral surfaces of the housing, preferably on two other mutually adjoining lateral surfaces of the housing.

The handling of a laboratory device, in particular of a laboratory device of the type mentioned above, is furthermore able to be improved by the means and features of the second independent claim targeting a laboratory device. To this end, what is thus proposed is a laboratory device that has a placement surface and a presence sensor that is configured to detect the presence of a vessel on the placement surface. Using the presence sensor, it is possible to identify whether a vessel, in particular a stirred vessel, has been placed on the placement surface of the laboratory device. If the presence sensor is able to detect the presence of a vessel on the placement surface, it may transfer a corresponding sensor signal to a functional unit, in particular a drive and/or a heater of the laboratory device, by way of which sensor signal the functional unit is activated. If the vessel is removed from the placement surface, this may also be detected using the presence sensor. The at least one functional unit, in particular a drive and/or a heater, may be deactivated by an appropriate sensor signal. A magnetic stirring drive for a stirring magnet may for example be used as drive. The laboratory device may in this case be a laboratory device as claimed in one of the other claims targeting a laboratory device.

In one embodiment of the laboratory device, provision is made for the presence sensor to be arranged underneath the placement surface. It is furthermore possible to use a capacitive sensor as presence sensor. In order to convert the sensor signals from the presence sensor into control commands, the laboratory device may have a control unit. The control unit may be connected both to the presence sensor and to a functional unit, for example a drive and/or a heater of the laboratory device.

In order to improve the handling of a laboratory device of the type mentioned at the outset, what is also proposed is a laboratory device of this type having the means and features of the third independent claim targeting such a laboratory device. To achieve the object, the laboratory device may have a display apparatus that has a ring-shaped display element in or on or under a placement surface of the laboratory device. If the display element has an appropriate diameter, it is possible for it to externally surround and/or define a standing surface for a vessel within the placement surface. It is possible to output operating parameters, such as for example a torque, a rotational speed, a power or else a temperature via the ring-shaped display element of the display apparatus. The fact that the corresponding operating parameters are displayed via the ring-shaped display element allows particularly intuitive and quick reading for a user, which simplifies handling of the laboratory device.

The ring-shaped display element allows various display modes. It is thus for example possible to output displays of different colors via the display element. In particular if the ring-shaped display element is a closed ring-shaped display element, it is possible for example to display the operation of the laboratory device via running light that moves over the ring-shaped display element. A direction of rotation of a drive may be output through the direction of movement of such running light. A rotational speed and/or a power may be displayed by the speed of the running light that is able to be output via the display element. Overall, this thus allows particularly intuitive and fast reading of the display element.

A similar situation applies with the display of a torque or a power of the laboratory device. If the ring-shaped display element is activated only partially, that is to say for example within a particular angular range, the proportion of its maximum power with which the laboratory device is operated becomes apparent at first glance.

In one embodiment, the display apparatus has a ring-shaped light guide as display element. However, it is also possible and preferable for the display apparatus to have a group of several light sources, in particular LEDs, arranged in a ring shape as display element. It is particularly advantageous for what are known as RGB-LEDs to be used as LEDs. It is thereby possible to output a very wide variety of colors via the display element of the display apparatus and thus to express a very wide variety of states of the laboratory device using color coding.

In order to protect the display element of the display apparatus against possibly aggressive environmental conditions, it is advantageous for said display element to be arranged underneath the placement surface. The placement surface may furthermore be translucent in order to allow light emitted by the display element to pass to the outside. For this purpose, the placement surface may consist of a transparent material and/or have at least one translucent opening, for example at least one hole and/or at least one slot.

The display apparatus may have an information output unit that is connected to the display element. Operating parameters of the laboratory device may be output via the display element using the information output unit. If the laboratory device has an appropriate sensor system, it is also possible to output parameters of a substance that is treated or processed by the laboratory device via the information output unit and the display element connected thereto.

A placement surface, for example the one already mentioned above, of the laboratory device may be formed from a glass panel and/or from a plastic panel and/or from a PMMA panel and/or comprise a glass panel and/or a plastic panel and/or a PMMA panel. The placement surface of the laboratory device is thereby particularly resistant against aggressive environmental conditions that may occur in the laboratory environment. It is additionally possible to design such a placement surface to be translucent, such that it is suitable for use with the display apparatus mentioned in detail above.

The laboratory devices mentioned above may be designed as laboratory stirrers, in particular as magnetic stirrers. It is furthermore possible for a drive, in particular a stirring drive, preferably a magnetic stirring drive, to be arranged in a or the housing, already mentioned above, of the laboratory device as at least one functional unit.

The object is finally also achieved by a laboratory device arrangement comprising at least two laboratory devices coupled to one another as claimed in one of the claims targeting a laboratory device.

Provision may be made in this case for one laboratory device of the at least two laboratory devices of the laboratory device arrangement to be connected, via its coupling interface, to the mating coupling interface of another laboratory device of the at least two laboratory devices. The laboratory devices may be connected directly via coupling interfaces and mating coupling interfaces that are connected to one another. However, it is also possible to connect two laboratory devices to one another via an intermediate part that is connected to a coupling interface of one laboratory device, on the one hand, and to a mating coupling interface of another laboratory device, on the other hand.

It is furthermore possible for the laboratory device arrangement to have a control module. This control module may be connected to one of the at least two laboratory devices and be connected thereto in the usage position. The connection between the control module and the one of the at least two laboratory devices may in this case be made via a coupling interface and/or a mating coupling interface of the laboratory device. In this connection, it is expedient for the control module to have a mating coupling interface compatible with the coupling interface and/or a coupling interface compatible with the mating coupling interface.

It is particularly expedient for the control module to have a coupling interface and a mating coupling interface. The control module may furthermore be configured, in the usage position, to control each laboratory device of the laboratory device arrangement, preferably separately. In one operating mode, provision may furthermore be made to combine several of the at least two laboratory devices of the laboratory device arrangement to form a functional group and then to control this functional group jointly using the control module. It is thus possible to combine a multiplicity of laboratory devices from a laboratory device arrangement to form such functional groups and to actuate them in groups in a particularly convenient manner. It is particularly advantageous for one of the at least two laboratory devices to be designed and/or able to be used as a control module.

In one embodiment of the laboratory device arrangement that has already been explained above, it comprises at least one preferably rigid intermediate part. The intermediate part may be used to connect two laboratory devices of the laboratory device arrangement to one another. The intermediate part may be used to transfer power and/or information between laboratory devices connected by the intermediate part. Such an intermediate part may be used to bridge a spacing between laboratory devices to be coupled to one another.

The intermediate part may comprise at least one coupling interface and at least one mating coupling interface that are preferably arranged and/or formed on opposing ends of the intermediate part. The intermediate part may be connected, by way of its coupling interface, to the mating coupling interface of a laboratory device. The intermediate part may be connected, by way of its mating coupling interface, to the coupling interface of another laboratory device. The laboratory devices are thereby able to be connected to one another via the interposed intermediate part and power and/or information is able to be transferred between the laboratory devices via the interposed intermediate part.

To achieve the object, what is furthermore also proposed is the use of a laboratory device as claimed in one of the claims targeting a laboratory device as a control module for actuating laboratory devices in a laboratory device arrangement as claimed in one of the claims targeting same.

BRIEF DESCRIPTION OF THE DRAWINGS

Exemplary embodiments of the invention are described below with reference to the drawing. However, the invention is not restricted to the exemplary embodiment shown in the figures. Further exemplary embodiments arise by combining the features of individual claims or of a plurality of claims with one another and/or with individual features or a plurality of features of the exemplary embodiments that are shown. In the figures, in part in a highly schematic illustration:

DESCRIPTION OF THE EXEMPLIFIED EMBODIMENTS

In the following description of various embodiments of the invention, elements having a matching function are given matching reference numerals, even if their design or shape is different.

All of the figures each show at least parts of a laboratory device that is referenced 1 in its entirety. The laboratory device 1 is designed as a magnetic stirrer and has a housing 2 on which two coupling interfaces 3 and two mating coupling interfaces 4 compatible therewith are arranged.

Both the coupling interfaces 3 and the mating coupling interfaces 4 are each configured both to transfer power and to transfer information between laboratory devices 1 that are coupled to one another. The term "transfer information" or "information transfer" in this case comprises both the transfer of setting and/or control signals and the transfer of data, for example relating to the laboratory device 1 and/or a substance treated by the laboratory device 1.

The coupling interfaces 3 are arranged on two different lateral surfaces 5 of the housing 2 of the laboratory device 1. The mating coupling interfaces 4 are arranged on two other lateral surfaces 6 of the housing 2.

An electrical/electronic functional unit 7 in the form of a magnetic stirring drive is arranged in the housing 2. The coupling interfaces 3 and the mating coupling interfaces 4 are electrically connected and connected in terms of information to one another, on the one hand, and also to the functional unit 7, on the other hand. The functional unit 7, here the magnetic stirring drive, is thereby able to be supplied both with power and with control signals via the coupling interfaces 3 and the mating coupling interfaces 4.

The coupling interfaces 3 each comprise a plug connector 8, while the mating coupling interfaces 4 are each equipped with a mating plug connector 9 compatible with the plug connectors 8. The plug connectors 8 have contact elements 10 in the form of contact pins 11, while the mating plug connectors 9 are equipped with mating contact elements 12 in the form of contact recesses or contact sockets 13. The contact pins 11 are spring-mounted and allow reliable contact with the contact recesses or contact sockets 13, even in the case of changing loading of laboratory devices 1 that are connected to one another.

Figure 10:
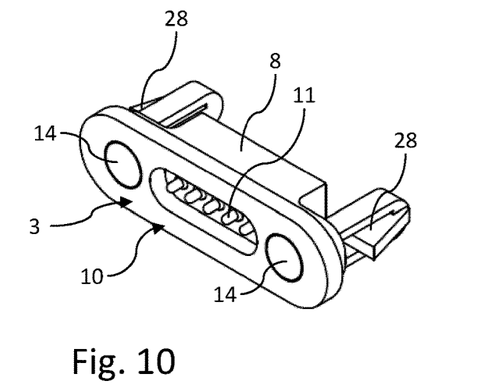
FIG. 10 shows a perspective view of a plug connector used on the coupling interface.
Figure 11:
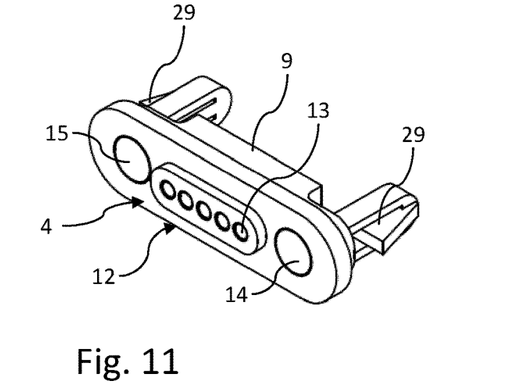
FIG. 11 shows a perspective view of a mating plug connector used on the mating coupling interface.

FIG. 10 shows a detailed illustration of a plug connector 8 with its total of five contact pins 11. FIG. 11 shows the matching mating plug connector 9, which accordingly has five contact recesses or contact sockets 13, in which the contact pins 11 engage in the usage position. Both the plug connector 8 and the mating plug connector 9 are fastened in an appropriate recess in the housing 2 of the laboratory device 1 using fastening clips 28 and 29.

The plug connector 8 is equipped with two magnetic coupling elements 14. The mating plug connector 9 has two corresponding magnetic mating coupling elements 15.

The coupling interface 3 is able to be connected to the mating coupling interface 4 in a reliable and easily detachable manner using the magnetic coupling elements 14 and the corresponding magnetic mating coupling elements 15. Two laboratory devices 1 having such coupling interfaces 3 and mating coupling interfaces 4 are thereby able to be connected magnetically and mechanically to one another in order to establish a power supply and a connection in terms of information between the two laboratory devices 1.

In one exemplary embodiment of the laboratory device 1, not shown in the figures, the coupling interfaces 3 are equipped with latching elements and the mating coupling interfaces 4 are equipped with mating latching elements designed in a manner corresponding thereto. Latching the latching elements to the mating latching elements makes it possible to establish a particularly secure connection between two laboratory devices 1 that are connected to one another, which connection may of course be detached again when needed in order to separate the laboratory devices 1 from one another.

The housing 2 of the laboratory devices 1 shown in the figures has a symmetrical cross section. Lateral surfaces 5 and 6 of the housing 2 are arranged at a right angle to one another. This applies in particular to mutually adjoining lateral surfaces 5 and 6 of the housing 2. The coupling interfaces 3 are formed on the lateral surfaces 5, while the mating coupling interfaces 4 are formed on the lateral surfaces 6 of the housing 2.

Figure 5:
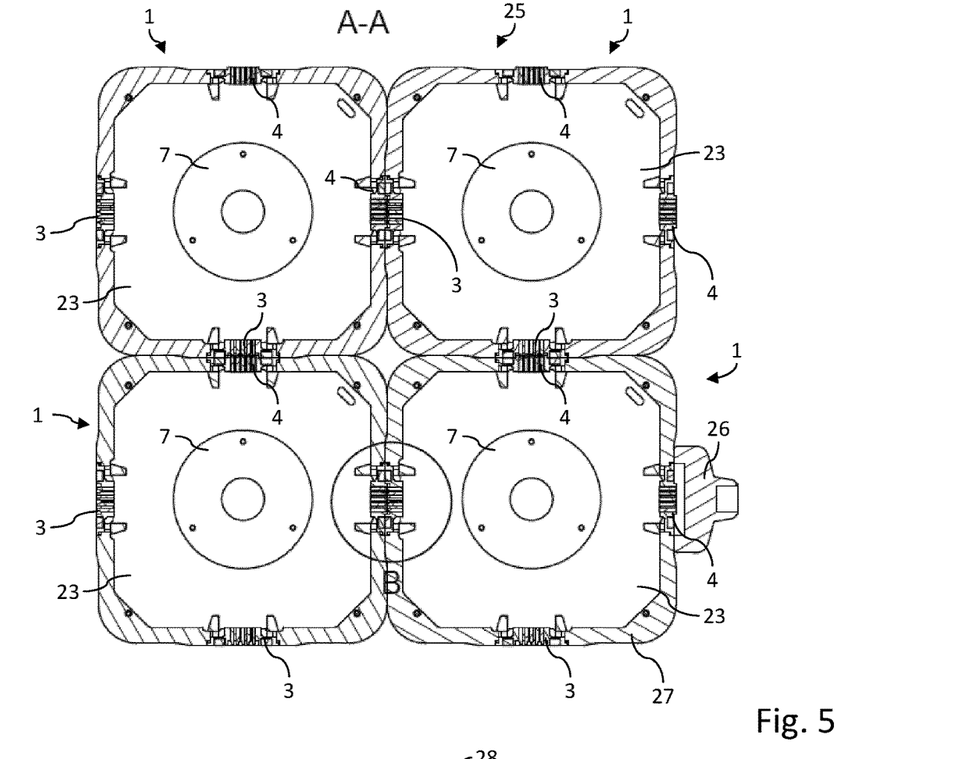
FIG. 5 shows a section of the laboratory device arrangement cut along the cutting line A to A in FIG. 4.
Figure 8:
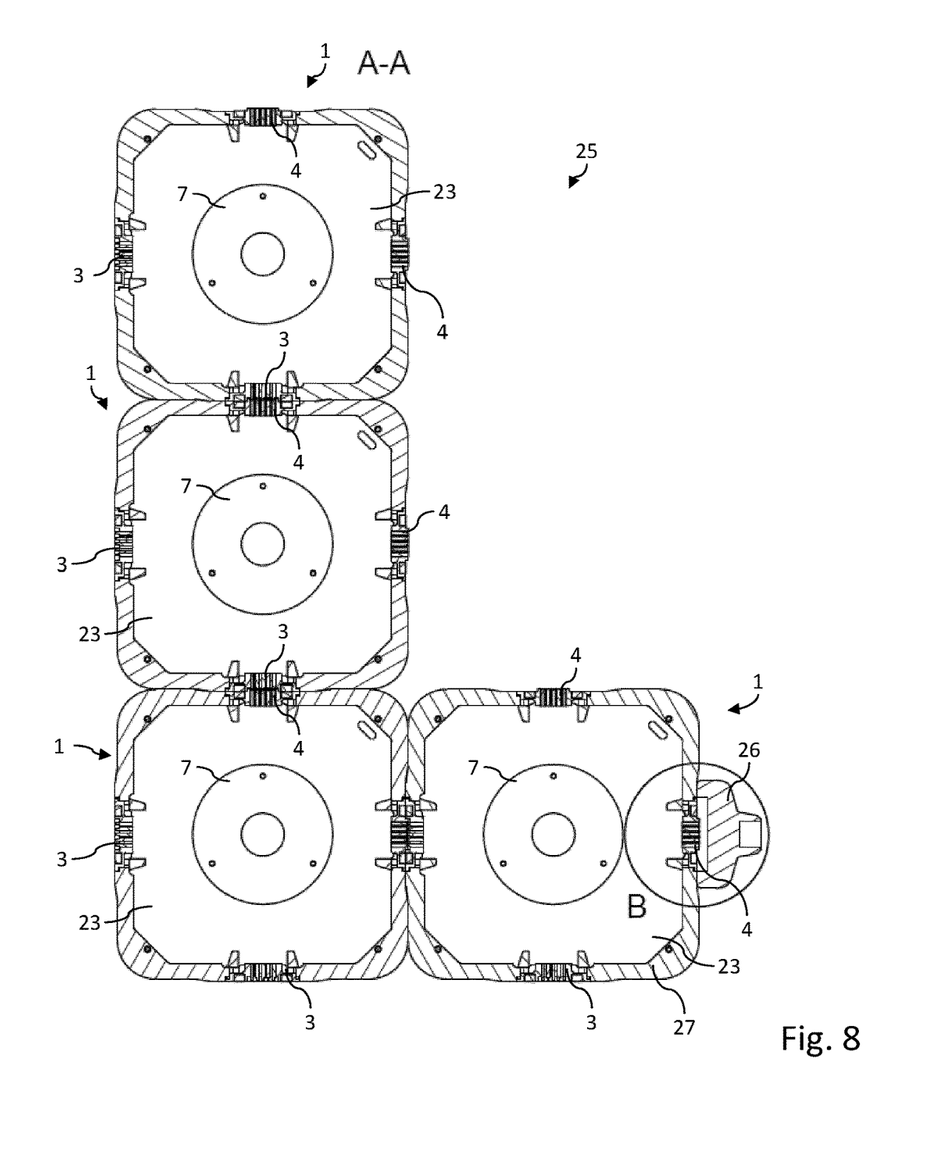
FIG. 8 shows a view of the laboratory device arrangement cut along the line A to A shown in FIG. 7.
Figure 9:
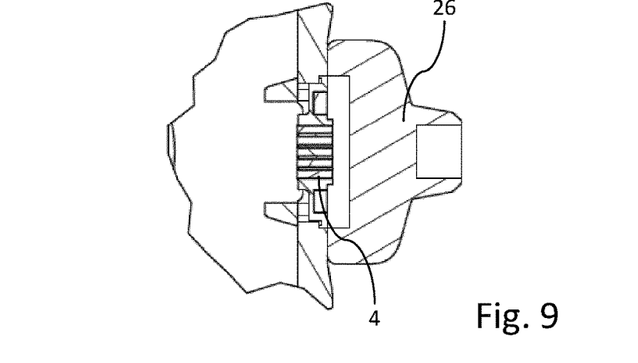
FIG. 9 shows a magnified illustration of the feature marked by the circle in FIG. 8.

The coupling interfaces 3 are each provided with a centering means 16 in the form of a housing bulge. The mating coupling interfaces 4 have mating centering means 17 designed in a manner corresponding thereto, these being formed as housing indentations. FIGS. 5 and 8 in particular elucidate how the centering means 16 and the mating centering means 17 of the laboratory devices 1 interact. They predefine a correct relative position of two laboratory devices 1 to be connected to one another and facilitate fast connection of the laboratory devices 1 to be connected.

FIGS. 2, 5, 8 and 12 to 14 elucidate that the coupling interfaces 3 and the mating coupling interfaces 4 are each arranged in pairs on opposing lateral surfaces 5 and 6 of the housing 2. Either a coupling interface 3 or a mating coupling interface 4 is arranged on each of the total of four lateral surfaces 5, 6 of the housing 2. Each of the laboratory devices 1 shown in the figures thus offers the option, at each of its lateral surfaces 5, 6, of coupling to another laboratory device 1 that has corresponding coupling interfaces 3 and/or mating coupling interfaces 4.

In the exemplary embodiments of laboratory devices 1 shown in the figures, the coupling interfaces 3 are arranged on two mutually adjoining lateral surfaces 5 of the housing 2. The two mating coupling interfaces 4 of the laboratory device 1 that is shown are likewise arranged on two mutually adjoining lateral surfaces 6 of the housing 2 of the laboratory device 1.

Figure 1:
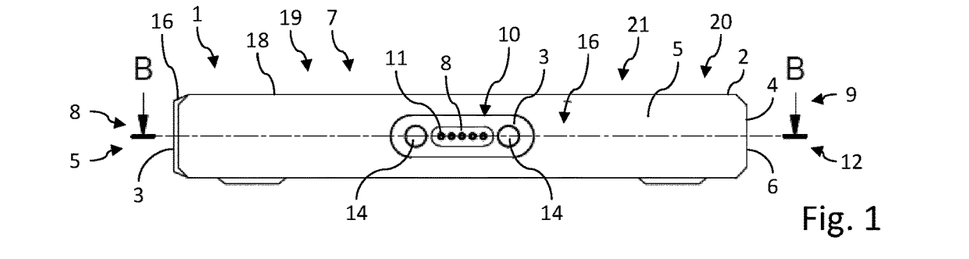
FIG. 1 shows a side view of a laboratory device according to the invention.
Figure 2:
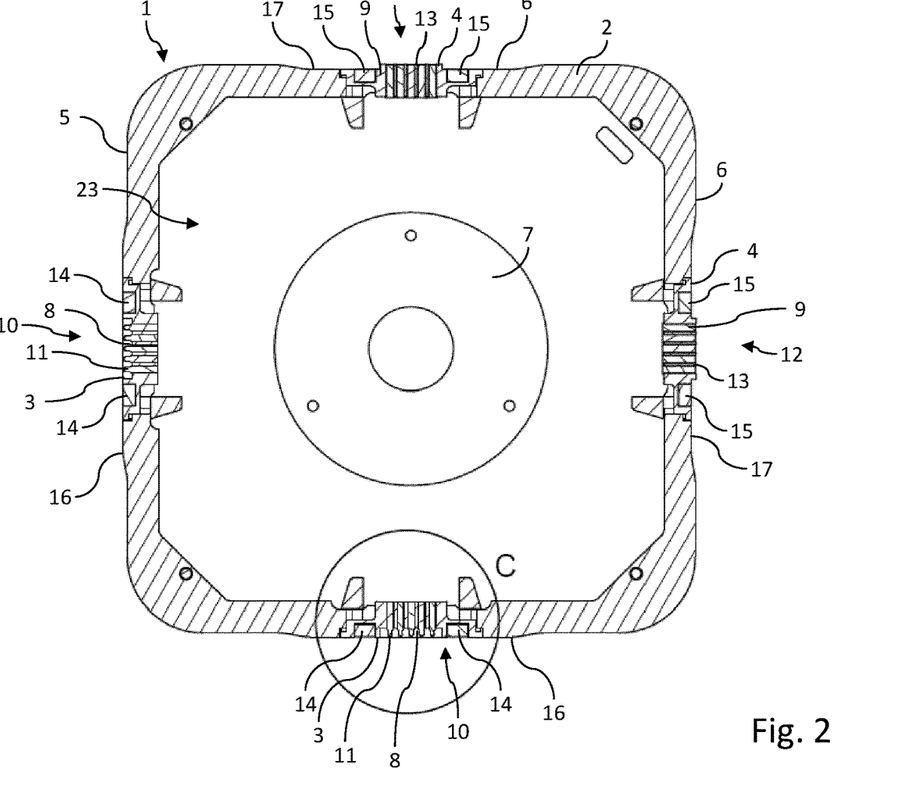
FIG. 2 shows a plan view of the laboratory device cut along the line B to B shown in FIG. 1.
Figure 3:
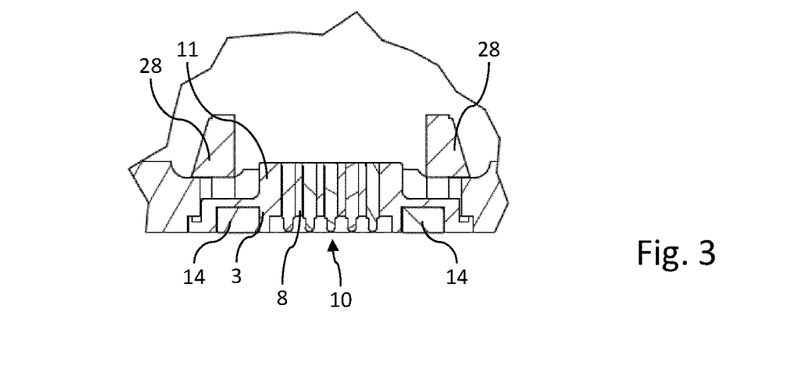
FIG. 3 shows a magnified illustration of the feature marked by the circle in FIG. 2.
Figure 4:
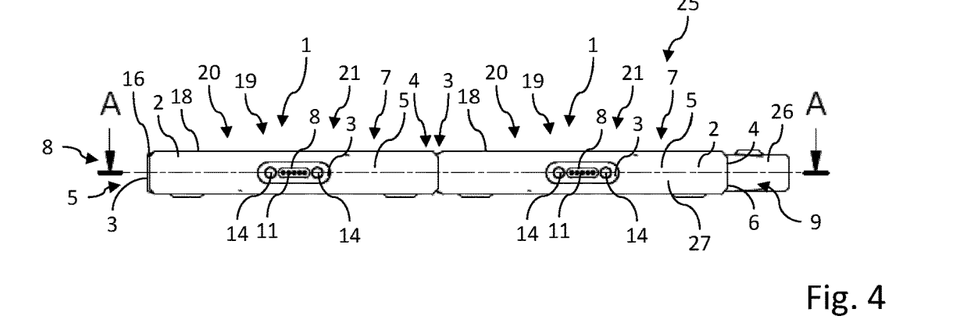
FIG. 4 shows a side view of a laboratory device arrangement that comprises a plurality of laboratory devices of the type of laboratory device shown in FIGS. 1 to 3.

Due to its magnetic drive 7, the laboratory device shown in FIG. 1 is a laboratory stirrer 1. The magnetic drive 7 arranged inside the housing 2 is a magnetic stirring drive 7 by way of which it is possible to transfer a torque, through a placement surface 18 of the laboratory device 1 and through a wall of a stirred vessel, not shown in the figures, to a stirring magnet, not shown in the figures.

Figure 12:
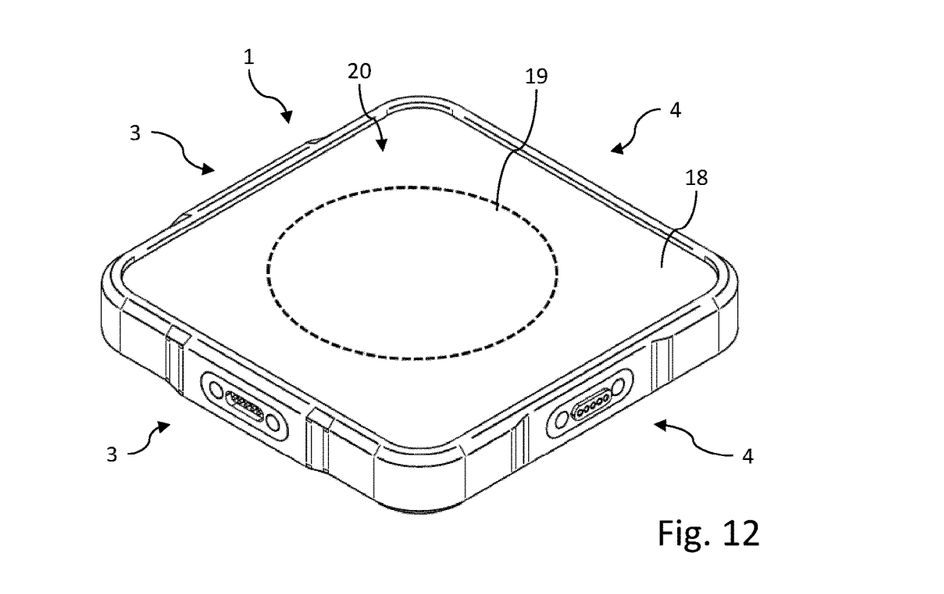
FIG. 12 shows a perspective view of a laboratory device having a presence sensor on its placement surface.

The placement surface 18 of the laboratory device 1 is assigned a presence sensor 19. This presence sensor 19 is configured to detect a vessel (not illustrated in the figures) on the placement surface 18. The presence sensor 19 is illustrated in FIG. 12 and designed as a capacitive sensor. The presence sensor 19 is arranged underneath the placement surface 18. Using the presence sensor 19, the laboratory device 1 is able to identify when a stirred vessel is placed on the placement surface 18 of the laboratory device 1. The magnetic stirring drive 7 of the laboratory device 1 may be activated automatically by an appropriate sensor signal from the presence sensor 19. It is thus possible to avoid separately operating the laboratory device 1 in order to activate the magnetic stirring drive 7. If the stirred vessel is removed from the placement surface 18 of the laboratory device 1, this is also detected by the presence sensor 19. The magnetic stirring drive 7 of the laboratory device 1 may then be deactivated automatically by an appropriate sensor signal or through the absence of an appropriate sensor signal. This may lead to significant simplification in terms of handling the laboratory device 1. The sensor signals from the presence sensor 19 may be processed by a control unit 20 of the laboratory device 1 and converted into appropriate control signals. It is thus possible to activate and to deactivate the magnetic stirring drive 7 by way of the control unit 20 on the basis of the sensor signal from the presence sensor 19.

Figure 13:
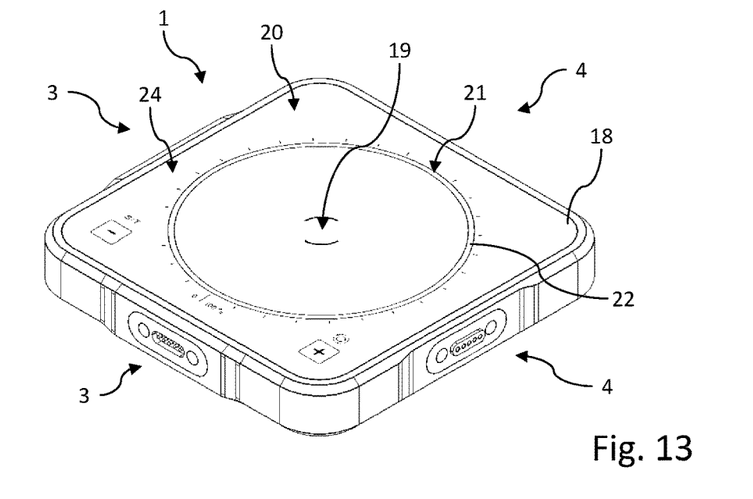
FIG. 13 shows a perspective view of a laboratory device, on the placement surface of which it is possible to see a ring-shaped display element of a display apparatus of the laboratory device.
Figure 14:
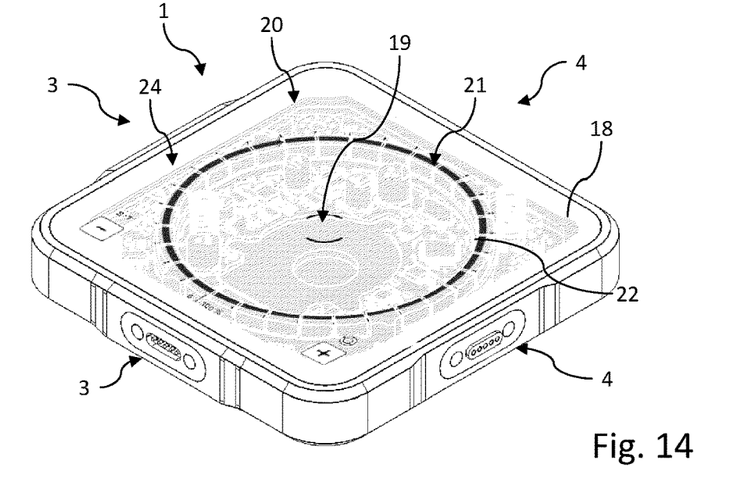
FIG. 14 shows a perspective view of the laboratory device illustrated in FIG. 13 with a placement surface illustrated in transparent form, it being possible to see, underneath the placement surface, a closed ring group consisting of a plurality of LEDs that together form the display element of the display apparatus.
Figure 15:
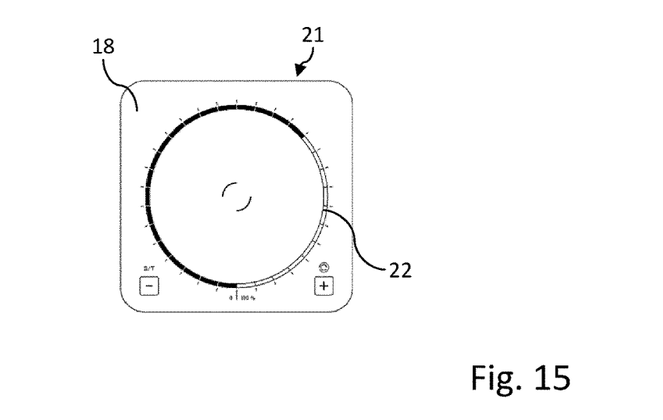
FIG. 15 shows a view of the display apparatus of the laboratory device illustrated in FIGS. 13 and 14 in order to elucidate the function of the display element.

FIGS. 13 to 15 show the laboratory device 1 with its display apparatus 21. The display apparatus 21 has a ring-shaped display element 22 that is arranged underneath the placement surface 18 of the laboratory device 1. The display element 22 of the laboratory device 1 is visible through the placement surface 18 and may be read by a user of the laboratory device 1.

FIG. 14 elucidates that the ring-shaped display element 22 of the display apparatus 21 consists of a group of several light sources arranged in a ring shape. The light sources are LEDs. The ring-shaped display element 22 furthermore surrounds an installation space 23 in which the magnetic stirring drive 7 of the laboratory device 1 is arranged in the usage position. The magnetic stirring drive 7 is not illustrated in FIG. 14 for the sake of improved clarity. The display element 22 is arranged underneath the placement surface 18. The placement surface 18 is translucent at least in the region that is arranged above the display element 22 in the usage position of the placement surface 18. This is elucidated in particular by FIG. 15, which shows a plan view of the placement surface 18 with the partially activated display element 22 located underneath it.

The display apparatus 21 has an information output unit 24. The information output unit 24 is connected to the display element 22. Various information, for example process parameters or possibly also information about a medium treated using the laboratory device 1 or a substance treated using the laboratory device 1 may be output to the information output unit 24 via the display apparatus 21 and its display element 22. The placement surface 18 of the laboratory device 1 is formed by a glass panel that has high resistance against aggressive substances.

FIGS. 5 and 8 then show two different embodiments of laboratory device arrangements 25 that are able to be created using the laboratory devices 1 described in detail above. The laboratory device arrangements 25 consist of four laboratory devices 1 that are coupled to one another. The laboratory devices 1 are connected to one another via their coupling interfaces 3 and their mating coupling interfaces 4. The laboratory device arrangement 25 is able to be expanded by further laboratory devices 1 at the free coupling interfaces 3 and mating coupling interfaces 4.

Figure 6:
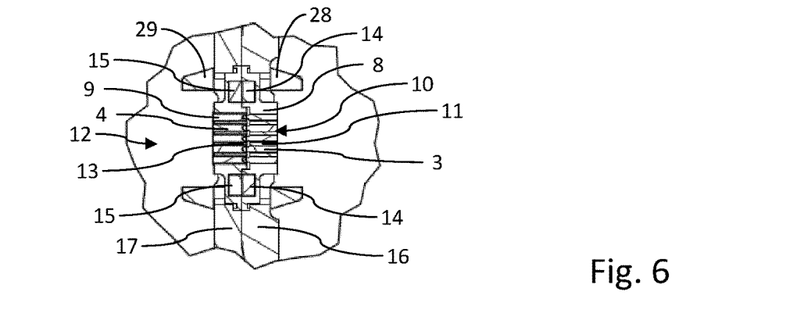
FIG. 6 shows a magnified illustration of the feature marked by the circle in FIG. 5.
Figure 7:
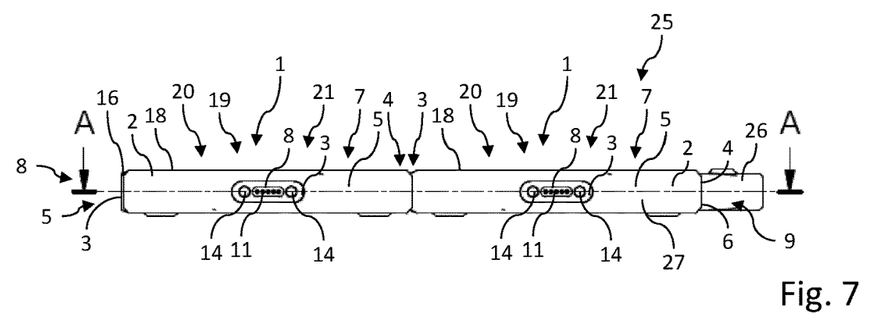
FIG. 7 shows a further side view of a differently configured laboratory device arrangement.

The entire laboratory device arrangement 25 and all of the laboratory devices 1 forming the laboratory device arrangement 25 are able to be supplied with power via a connection 26 shown in FIGS. 5 and 6 and also 8 and 9. For this purpose, the connection 26 is connected to a mating coupling interface 4 of one of the laboratory devices 1 of the laboratory device arrangement 25. The laboratory device 1 to which the connection 26 is connected may serve as control module 27 for the entire laboratory device arrangement 25 and all of the laboratory devices combined therein. The laboratory device 1 operating as control module 27 is thus connected, via one of its coupling interfaces 3 and/or via one of its mating coupling interfaces 4, to another of the laboratory devices from the laboratory device arrangement 25.

From the control module 27, control signals may be transferred, via the coupling interfaces 3 and the mating coupling interfaces 4, to all of the laboratory devices 1 of the laboratory device arrangement 25. It is possible to combine individual laboratory devices 1 of the laboratory device arrangement 25 to form groups, and then to control these in groups via the control module 27.

The laboratory device 1 operating as control module 27 thus adopts the function of a master in the laboratory device arrangement 25, all of the other laboratory devices 1 in the laboratory device arrangement 25 then being subordinate to this master. The laboratory device 1 operating as control module 27 is thus configured, in its usage position shown in FIGS. 5 and 8, to control and/or to regulate each laboratory device 1 of the laboratory device arrangement 25 separately when needed. The laboratory device 1 in the laboratory device arrangement 25 is thus used as control module 27 for controlling all of the laboratory devices 1 of the laboratory device arrangement 25.

The invention is concerned with improvements in the technical field of laboratory devices. To this end, what is proposed, inter alia, is a laboratory device 1 that has, on its housing 2, at least one coupling interface 3 and at least one mating coupling interface 4 compatible with the coupling interface 3. The coupling interface 3 and the mating coupling interface 4 are configured to transfer power and/or to transfer information.

The invention claimed is:

1. A laboratory device (1) having a housing (2) on which at least one coupling interface (3) and at least one mating coupling interface (4) compatible with the coupling interface (3) are arranged, in which the coupling interface (3) and the mating coupling interface (4) are designed to transfer at least one of: i. power and ii. information, wherein the laboratory device (1) has a placement surface (18) and a presence sensor (19) that is configured to detect the presence of a vessel on the placement surface (18).

2. The laboratory device (1) as claimed in claim 1, wherein the at least one coupling interface (3) is arranged on a first lateral surface (5, 6) of the housing (2) and the at least one mating coupling interface (4) is arranged on a second lateral surface (5, 6) of the housing (2).

3. The laboratory device (1) as claimed in claim 2, wherein the first and second lateral surfaces (5, 6) are mutually adjoining and arranged at a right angle to one another.

4. The laboratory device (1) as claimed in claim 2, wherein the first and second lateral surfaces (5, 6) are arranged on opposing sides of the housing (2).

5. The laboratory device (1) as claimed in claim 1, wherein the at least one coupling interface (3) and the at least one mating coupling interface (4) are electrically connected to one another.

6. The laboratory device (1) as claimed in claim 1, wherein the coupling interface (3) comprises a plug connector (8) and the mating coupling interface (4) comprises a mating plug connector (9).

7. The laboratory device (1) as claimed in claim 6, wherein the plug connector (8) has at least one magnetic coupling element (14) and the mating plug connector (9) has at least one magnetic mating coupling element (15).

8. The laboratory device (1) as claimed in claim 6, wherein the plug connector (8) includes contact elements (10), and the mating plug connector (9) includes contact sockets (13).

9. The laboratory device (1) as claimed in claim 1, wherein the coupling interface (3) has a centering means (16) and wherein the mating coupling interface (4) has a mating centering means (17).

10. The laboratory device (1) as claimed in claim 1, wherein the at least one coupling interface (3) is arranged on mutually adjoining first and second lateral surfaces (5) of the housing (2) and wherein the at least one mating coupling interface (4) is arranged on mutually adjoining third and fourth lateral surfaces (6) of the housing (2).

11. The laboratory device (1) as claimed in claim 1, wherein the presence sensor (19) is arranged underneath the placement surface (18).

12. The laboratory device (1) as claimed in claim 1, further comprising a display apparatus (21), wherein the display apparatus (21) has a ring-shaped display element (22) fixed to the placement surface (18) of the laboratory device (1).

13. The laboratory device (1) as claimed in claim 12, wherein the display element (22) has a group of several light sources.

14. The laboratory device (1) as claimed in claim 13, wherein the several light sources are light emitting diodes (LEDs).

15. The laboratory device (1) as claimed in claim 12, wherein the display element (22) is arranged underneath the placement surface (18) and wherein the placement surface (18) is translucent.

16. The laboratory device as claimed in claim 12, wherein the display apparatus (21) has an information output unit (24) that is connected to the display element (22).

17. The laboratory device (1) as claimed in claim 1, wherein the placement surface (18) of the laboratory device (1) includes one or more of: a glass panel, a plastic panel, and a PMMA panel.

18. The laboratory device (1) as claimed in claim 1, wherein the laboratory device (1) is a magnetic stirrer, and wherein a magnetic stirring drive (7), associated with the laboratory device (1), is arranged in the housing (2) of the laboratory device (1).

19. A laboratory device arrangement (25) comprising first and second laboratory devices (1) each formed in accordance with claim 1, connected to one another.

20. The laboratory device arrangement (25) as claimed in claim 19, wherein the first laboratory device (1) is connected via the at least one coupling interface (3) thereof directly to the at least one mating coupling interface (4) of the second laboratory device (1).

21. The laboratory device arrangement (25) as claimed in claim 20, further comprising a control module (27) configured to separately control the first and second laboratory devices (1), the control module (27) being connected to at least one of the first and second laboratory devices (1).

22. The laboratory device arrangement (25) as claimed in claim 21, further comprising a third laboratory device (1), connected with at least one of the first and second laboratory devices (1), configured as the control module (27).

23. The laboratory device arrangement (25) as claimed in claim 20, wherein at least one of the first and second laboratory devices (1) is configured to separately control the first and second laboratory devices (1).

24. The laboratory device arrangement (25) as claimed in claim 19, wherein the laboratory device arrangement (25) further comprises at least one intermediate part via which the first and second laboratory devices (1) are indirectly connected to one another.

25. The laboratory device (1) as claimed in claim 1, wherein the at least one coupling interface (3) and the at least one mating coupling interface (4) are connected to allow transfer of information therebetween.

26. The laboratory device (1) as claimed in claim 1, wherein the at least one coupling interface (3) has a latching element, and the at least one mating coupling interface (4) has a mating latching element.

27. The laboratory device (1) as claimed in claim 1, wherein the presence sensor (19) is a capacitive sensor.

28. The laboratory device (1) as claimed in claim 1, further comprising a control unit (20).

* * * * *